Patented Apr. 7, 1942

2,278,465

UNITED STATES PATENT OFFICE 2,278,465

METHOD FOR PRODUCING PREPARED CEREALS, GRAINS, AND SIMILAR PRODUCTS

Albert Musher, New York, N. Y., assignor to Musher Corporation, New York, N. Y., a corporation of New Jersey No Drawing. Application September 26, 1938, Serial No. 231,640

6 Claims. (Cl. 99—83)

This invention relates to the cooking of cereals, starches, grains and similar food products containing a relatively high amount of starch or other water absorbent materials.

These materials are not readily prepared in their most digestible condition by the manufacturer or commercial packer. Also since they expand, thicken or explode when cooked with water, they cannot be readily packaged or merchandised because of their expanded form.

Still further, when they are cooked, they tend to form disintegrated, mushy or pasty products. Also it is not readily possible to prepare them in most readily digestible condition, or in most appetizing condition.

Among the objects of this invention is to enable the conversion of high starch containing foods or similar materials such as farina, oatmeal, cornmeal, etc., into thoroughly cooked or soft condition without too great a loss in their compact structure and without a material increase in size and without the pastiness and mushiness that usually results when cereals are cooked with water. In this way they may be readily packaged, merchandised, and preserved.

A further object includes a method for precooking relatively high starch containing foods so as to produce a softer, more compact, more appetizing and more digestible cooked cereal.

Other and further objects and advantages will also appear from the more detailed description given below, it being understood however, that this more detailed description is given by way of illustration and explanation only and not by way of limitation, since various changes therein may be made by those skilled in the art without departing from the scope and sphere of the present invention.

It has been found that by cooking cereals, grains, and other starchy products such as farina, cornstarch, rice, oatmeal, cornmeal, wheat, hominy, etc., in concentrated sugar solutions or syrups that these materials may be cooked to a relatively finished cooked condition and to softness without, however, the substantial expansion or explosion of the starch cells, and without the formation of the pasty, mushy or disintegrated product.

The cereals may be precooked in the sugar syrup by cooking over a direct flame, or in a steam kettle, or they may be cooked under steam or super-atmospheric pressure, or under vacuum. Where these high starch materials are processed in sugar syrup under pressure, say for example 5 pounds to 50 pounds per square inch, the pressure may be released suddenly or slowly, or the pressure may be increased or decreased several times alternately so as to provide increased softness and further improved digestibility.

The preferred syrups may be prepared sugar solutions or food products containing concentrated sugar solutions in which the sugar content may be sucrose, dextrose, levulose, maltose, lactose, invert sugar, gelactose, arabinose, etc. These syrups may take the form of honey, maple syrup, molasses, corn syrup or similar products. The syrups may be flavored or colored, if desired, with edible materials, so as to flavor or color the cereal or other material boiled therein.

Although various concentrations of sugar, various temperatures and various time periods other than those mentioned herein may be used depending upon the degree of cooking required, the character of syrup used, the character of cereal used, etc., nevertheless, the preferred concentration of sugar in the aqueous solution or syrup usually should be over 35% and in many cases this concentration should be over 50 or 60%.

The cooking temperature desirably should be over 150° F. and the time period for cooking generally will vary, for example, from around 15 minutes to 3 hours or longer depending upon the temperature used and whether or not vacuum or atmospheric or super-atmospheric pressure is employed.

By regulating the amount of sugar that is used in the syrup and by varying the types of sugar that are used, it is possible to control the degree of exploding of the grains, or cereals, etc. For instance, if the syrup in which the cereal is cooked is more dilute, the cereal will expand more than it would if the syrup is in more concentrated form. Variation in the concentration of the sugar syrup in this manner may be used to regulate the resulting size of the various grains.

When the cereals which have been cooked or processed in the sugar syrups are later cooked with water, milk, or other similar materials, the resulting cooked product does not exhibit the pastiness or mushiness that results when the original untreated cereal is cooked in water.

Furthermore the grains or cereals retain, in large part, an individuality of the grain particles, and a retention of their compact structure, which has heretofore not been possible under the same conditions of cooking.

In view of the fact that when the starchy materials are cooked in sugar syrups they do not expand or stick together as when cooked in water with consequent gradual disintegration. Therefore, they may be more thoroughly cooked or they may be cooked over a longer period of time so as to substantially enhance their digestibility.

Cereals, for example, when precooked in sugar syrups, and subsequently cooked in water, do not absorb as much water as usual. As a result, a bowl of cereal which has been precooked in syrup contains much more concentrated nutritive value than a corresponding bowl of the old type of cereal which contains a substantially larger quantity of water.

In the commercial cooking of cereals, it, at times, is important to produce a cooked cereal that has softness and at the same time that is not substantially increased in size. Under the present process, high starch cereals, grains, etc., may be cooked in various sugar syrups such as sucrose syrups, honey, molasses, corn syrup, maple syrup, etc. so as to produce whatever softness and precooked quality that is necessary, without at the same time increasing the size of the particle or grain.

Because of the smaller size of the cooked cereals, they may be placed, in either their dried or moist form, in packages much smaller than would be necessary if these cereals were cooked in plain water or aqueous liquids with the resulting full expansion.

Many consumers, particularly where the cereal is to be used for children, cook their breakfast cereals as for instance, farina, oatmeal, cornmeal, etc., from periods up to one hour and even more in order to convert them into a condition of ready digestibility, notwithstanding the fact that these cereals are known as "quick cooking cereals."

However, according to the present invention, the consumer may complete the precooked cereal by just adding water or milk and then cooking for a very short time so as to get the full softness with the increased digestibility as compared to that resulting after the long cooking period of the untreated cereals.

Example I

Mix together 600 grams of water with 450 grams of granulated sugar. Heat to about 150° F. or until a syrup is formed. Add to this 75 grams of farina grains. Cook for 20 minutes. Maintain the temperature while cooking at around 200° F.

The resulting cereal grains will be very soft and they will be in a relatively unexploded condition. Also it will be noted that the cereal grains have remained in a separated, individual state and have not become mushy or pasty as they would become if they were cooked with plain water.

Honey, maple syrup, and similar syrups may be used in place of the sugar syrup given above. Also in order to vary the size or other characteristics of the cereal, the concentration of the sugar syrup above noted may be increased or decreased. By increasing the sugar concentration the size of the cereal grain will remain smaller, whereas if the sugar concentration is decreased the cereal grains will swell more.

Example II

Heat together 175 grams of sugar and 100 grams of water. When this becomes a syrup at about 140° F. add to this 20 grams of cornstarch. With a short cooking it will be noted that the cornstarch does not swell as it usually does with plain water but that a relatively thin bodied starch paste results.

If the sugar in this example is increased to 250 grams it is found that upon cooking there is practically no thickening of the cornstarch.

Hard fats or liquid oils may be mixed with the sugar syrup and the cereals while they are cooking in order to further enhance the softening of the fibers, and the quicker cooking thereafter, or so as to aid in the making of the product into a brick or solid unit thereafter.

Also in some cases it has been found to considerably improve the cereal or other starch containing material, to boil it in oil for a length of time ranging up to 2 or 3 hours or longer, and at a temperature preferably not over about 200° F., after which the cereal or other similar food may be treated with the sugar syrup in accord with this invention. This oil or fat preheating process tends to soften the fibers considerably in conjunction with the sugar syrup treatment as herein described.

Example III

Make a sugar syrup by heating together 125 grams of granulated sugar and 50 grams of water to a temperature of about 140° F. At this temperature add to the syrup 40 grams of farina. Mix together well and bring the temperature up to about 180° F. At this point add 80 grams of 110° melting point hardened fat. The fat will melt in the mixture. Allow this to cook for about 10 minutes at a temperature of around 200° F. The cooking time may be lengthened so as to increase the tenderness or softness of the cereal.

The fat and sugar may then be washed out of the product with hot water. Also, with or without draining off any excess syrup, the product may be formed into a substantially solid or brick material. In doing so it is advisable to chill the mixture quickly, or to stir it while it is cooling so as to get a uniform mixture.

After the cereals have been treated with the sugar syrup they may be washed with hot or cold water to remove the sugar from the cereal. They also may be treated further with or without washing to remove any additional sugar, as for example with steam. The cereals may then be packed or used either in their moist condition or they may be dried.

The cereals or other starch containing foods, preferably after they have been washed, although before they have been washed if necessary, may be dried in any of the usual ways.

Example IV

The product of Example I is mixed with about 20 times its weight of water. The combination is shaken together thoroughly and the water is drained off after the cereal is allowed to settle, or the separation is effected by centrifuging, etc. This washing may be repeated as many times as is necessary in order to remove as much of the sugar syrup as is required. The sugar in the wash water may be concentrated if desired to prepare a new cooking syrup.

After the cereal has been thoroughly washed it is then placed in trays in an incubator or into a drying oven where it is kept for about 24 hours at a temperature of around 130° F. Frequently it is desirable to mix or stir the cereal in the oven in order to aid in drying.

After the cereal has been dried it may be ground or pulverized or otherwise broken into pieces, particularly in the event that the drying has resulted in the remaining pieces being too large or being stuck together.

Instead of drying the cereal by placing it into a drying oven another method which may be used and which, at times is preferable, is to cook the processed cereal, preferably after it has been washed, in a melted hard fat or in a liquid oil. In this event the temperature should be maintained at for instance around 212° F. or a little over so that the moisture in the cereal may be boiled off, without burning the cereal, and without carmelizing any sugar that might remain. In some cases, however, it may be desired from a flavor standpoint to give the cereal, or the entire product, a toasting or roasting either at this point in the oil, or at various other points before or during the process as herein described.

Various gums and similar materials that expand when mixed with water without heating may also be treated in accord with this invention, without the application of heat.

*Example V*

For example, make a sugar solution by heating 100 grams of water and 200 grams of sugar to 140° F. Add to this syrup 10 grams of locust bean gum. It will be found that there is substantially little or practically no swelling of the gum as compared with its usual swelling activity in plain water.

Even after cereals produced in accord with this invention are dried, and all or a good part of the sugar has been washed out of them, they do not swell or explode when cooked with plain water to produce the usual pastiness or mushiness, but they retain their individuality of grain which is advantageous.

In the processing of these cereals with the sugar syrup, or in processing them so as to wash out the sugar after they have been treated with the sugar syrup, these cereals or similar products may be boiled in hot water or may be washed with various changes of hot water or they may be processed under pressure or under vacuum or by a steam process, and by similar means.

At times it has also been found to make an improved product in cooking these grains or cereals with syrups, to gradually add boiling water to the cereal-syrup mixture while it is being cooked, so as to gradually increase the concentration of the water in the product.

Among the various cereals which may be treated in accord with this invention are products as for instance, hominy, whole grains, rice, oatmeal, cornmeal, tapioca flour, cornstarch, and similar other high starch containing materials, as for instance, high starch dough products, and high starch noodles, alimentary pastes, etc.

Also, although less preferably, it has been found in some cases that concentrated viscous aqueous solutions or dispersions of materials, such as cooked starch, pectin, glycerine, or various other polyhydric alcohols or compounds, water soluble gums, and other paste forming materials, will to some extent produce the same results as the sugar syrups as noted herein. These materials may also be added to the sugar syrups above mentioned.

Also, various water absorbent materials, such as pectin, gelatin, albumen, skim milk powder, casein, gums as for instance, gum arabic, locust bean gum, tragacanth, or materials containing high concentrations of these substances, etc., when processed with sugar syrups as above described, will react very much the same as the cereal products in that they will not expand in their usual way. However, in these cases it has been found that the sugar syrup usually should be of increased concentration in order to produce relatively the same results as with cereal products.

As stated herein the present invention is preferably applied to the starchy materials mentioned herein and the desirable characteristics of preventing mushiness and disintegration are obtained particularly where such starch materials are used. These advantages, generally, however, are not obtained when other materials which contain relatively little or no starch, as for instance, nuts, soya beans, peas, sesame seed, spices, coffee beans, cocoa nibs, cottonseed and other materials, are treated in accord with this invention although other desirable results may be obtained, as, for instance, with reference to softening or precooking them.

What is claimed is:

1. The process of preparing an improved high starch food piece, said process comprising boiling the high starch food piece in a concentrated sugar solution, subsequently removing the excess sugar solution therefrom, and then allowing the surface sugar to dry thereon.

2. The process of preparing an improved high starch food piece, said process comprising boiling the high starch food piece in a concentrated sugar solution containing about 35% to 60% of sugar for a period ranging from 15 minutes to 3 hours and at a cooking temperature over 150° F.

3. The process of preparing an improved high starch food piece, said process comprising cooking the high starch food piece in a concentrated sugar solution, adding additional water during the boiling procedure so as to maintain the approximate desired concentration of the sugar solution, subsequently removing the excess sugar solution therefrom, and then drying.

4. The process of preparing an improved rice, said process comprising boiling the rice in a concentrated sugar solution, subsequently removing the excess sugar therefrom, and then allowing the surface sugar to dry thereon.

5. The process of preparing an improved rice, said process comprising boiling the rice in a concentrated sugar solution containing about 35% to 60% of sugar for a period ranging from 15 minutes to 3 hours and at a cooking temperature over 150° F., subsequently removing the excess sugar solution therefrom by allowing said excess sugar solution to drain therefrom, and then drying.

6. The process of preparing an improved high starch food piece, said process comprising boiling the high starch food piece in a concentrated sugar solution, said sugar solution also including a fat.

ALBERT MUSHER.